P. Johnson,
Stump Elevator.
N° 28,280.   Patented May 15, 1860.
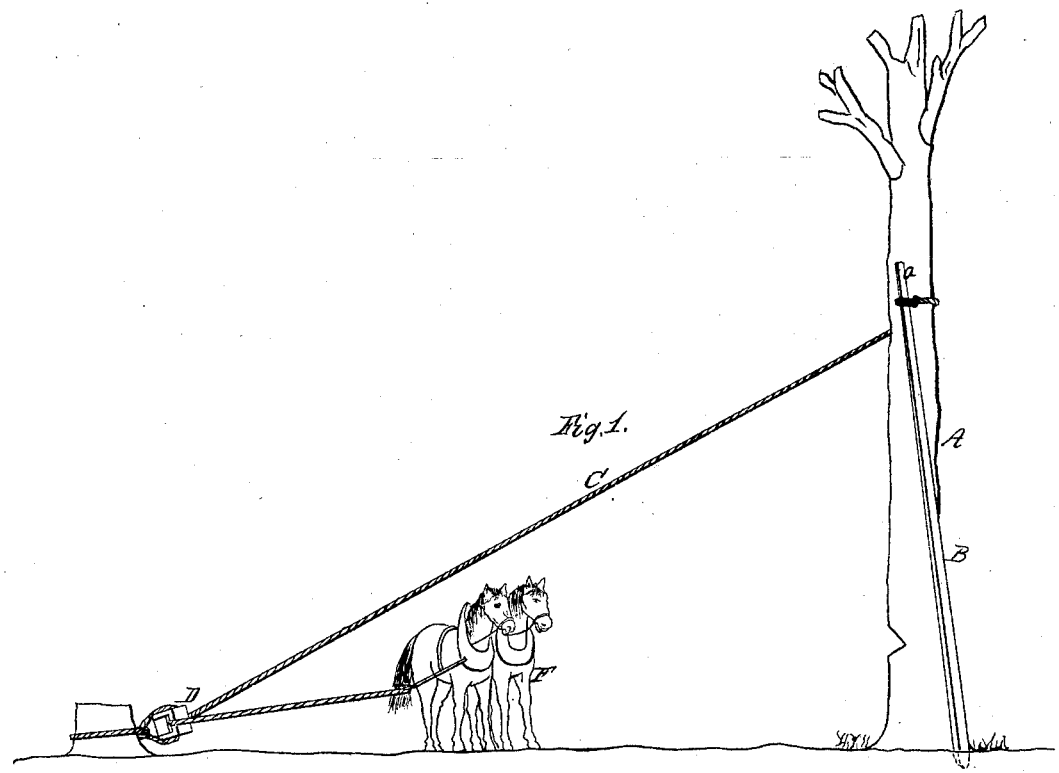
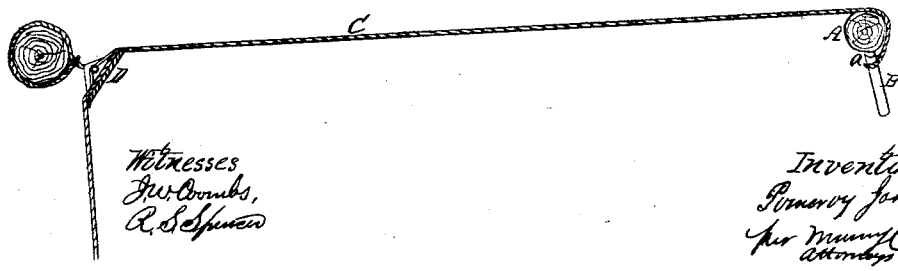

UNITED STATES PATENT OFFICE.

POMEROY JOHNSON, OF WHITNEYS POINT, NEW YORK.

FELLING TREES.

Specification of Letters Patent No. 28,280, dated May 15, 1860.

*To all whom it may concern:*

Be it known that I, POMEROY JOHNSON, of Whitneys Point, in the county of Broome and State of New York, have invented a new and useful Improvement in Felling Trees; and I do hereby declare that the following is a full, clear, and exact description of the same, reference being had to the annexed drawings, making a part of this specification, in which—

Figure 1, is a side elevation of my invention. Fig. 2, a plan or top view of ditto.

Similar letters of reference indicate corresponding parts in the two figures.

The object of this invention is to facilitate the felling of trees by dispensing with much of the cutting or chopping operation, and at the same time to place the falling of the tree under the complete control of the operator.

The invention consists in the employment or use of a pole or scantling provided with a metal point or end and having a rope attached which passes through a fixed pulley block, the parts being arranged substantially as hereinafter described, whereby, with the aid of a team, or other power, the desired end is attained.

To enable those skilled in the art to fully understand and construct my invention, I will proceed to describe it.

A, represents a tree to which my invention is applied, and B, is a pole or scantling of any suitable length, one end of which has a steel point $a$, attached, of such form that it may be firmly stuck into the body of the tree, at any convenient point from the ground, within the length of the pole or scantling, the lower end of which, rests on the ground.

C, is a rope, one end of which is attached to the upper part of the pole or scantling, near the steel point $a$, and the opposite end passes through a pulley block or sheave D, which is attached to a stump or any fixture at a proper distance from, and in a proper relative position with the tree A and a team F, is connected to this end of the rope.

The tree A, is felled by cutting or chopping into it a certain distance, say about one third of its diameter, and then by urging on the team F, the tree is pulled down and broken off at the cut. It will be seen that the tree will be made to fall in any direction, by placing the block, or sheave D, in a proper relative position with the tree, that is to say, in line with its intended or desired plane of descent.

The pole or scantling B, with its pointed end, admits of the rope C, being readily attached at the desired point to the tree to be felled, no ladder, or climbing operation being required to be gone through with, in order to attach the rope to the tree, even at a considerable elevation. The invention does not involve any appreciable amount of cost in construction, while the time and labor saved by its adoption in the felling of trees is such as to render it extremely valuable.

Having thus described my invention, what I claim as new and desire to secure by Letters Patent, is—

The combination of the pole or scantling B, provided with a steel or proper metal point $a$; the fixed pulley block or sheave D and rope C, with animal or other power attached, all being arranged and applied substantially as, and for the purpose set forth.

POMEROY JOHNSON.

Witnesses:
SAML. H. BIRDSALL,
E. B. SMITH.